(12) United States Patent
Scampini

(10) Patent No.: US 11,086,002 B1
(45) Date of Patent: Aug. 10, 2021

(54) ULTRASOUND SUB-ARRAY RECEIVER BEAMFORMER

(71) Applicant: Maxim Integrated Products, Inc., San Jose, CA (US)

(72) Inventor: John Frank Scampini, Lexington, MA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1170 days.

(21) Appl. No.: 14/980,442

(22) Filed: Dec. 28, 2015

Related U.S. Application Data (60) Provisional application No. 62/150,802, filed on Apr. 21, 2015.

(51) Int. Cl.
*G01S 7/00* (2006.01)
*G01S 7/52* (2006.01)
*G01S 15/89* (2006.01)

(52) U.S. Cl.
CPC ...... *G01S 7/52095* (2013.01); *G01S 15/8977* (2013.01)

(58) Field of Classification Search
USPC .......................................................... 367/11
See application file for complete search history.

(56) References Cited

U.S. PATENT DOCUMENTS

| | | | | |
|---|---|---|---|---|
| 4,825,109 A * | 4/1989 | Reynolds | ............... | H03K 5/131 327/258 |
| 4,849,764 A * | 7/1989 | van Heyningen | .... | G01S 7/2813 342/381 |
| 5,095,536 A * | 3/1992 | Loper | ...................... | H03D 3/00 329/327 |
| 5,555,534 A * | 9/1996 | Maslak | ............... | G01S 15/8927 367/135 |
| 5,675,554 A * | 10/1997 | Cole | ................... | G01S 7/52026 367/11 |
| 5,685,308 A * | 11/1997 | Wright | ................ | G01S 7/52023 600/443 |
| 5,724,972 A * | 3/1998 | Petrofsky | ............. | G10K 11/346 600/437 |
| 5,817,024 A * | 10/1998 | Ogle | ........................ | A61B 8/00 600/447 |
| 5,828,247 A * | 10/1998 | Moller | ............... | H03K 17/0822 327/110 |
| 5,835,850 A * | 11/1998 | Kumar | .................. | H04B 17/15 455/67.14 |

(Continued)

*Primary Examiner* — James R Hulka
(74) *Attorney, Agent, or Firm* — Robert Crownover (57) ABSTRACT

An ultrasound method and apparatus can include: transducer elements arranged in a sub-array for generating analog signals based on a return signal detected by the transducer elements during a receive interval; analog delay lines including individual delays unique to each of the transducer elements and calculated based on a linear delay slope for delaying the analog signals; an analog to digital converter for converting the analog signals to a digital signal; a digital beamformer with a digital delay based on one portion of the linear delay slope for delaying the digital signal; and a profile control register containing depth bits corresponding to multiple points for updating the linear delay slope during the receive interval to adjust for the multiple points within an image line.

20 Claims, 7 Drawing Sheets

(56) References Cited

U.S. PATENT DOCUMENTS

| | | | | |
|---|---|---|---|---|
| 5,921,932 | A * | 7/1999 | Wright | G01S 15/8988 |
| | | | | 600/447 |
| 5,966,666 | A * | 10/1999 | Yamaguchi | H03D 7/163 |
| | | | | 455/552.1 |
| 6,104,673 | A * | 8/2000 | Cole | G01S 7/52017 |
| | | | | 367/11 |
| 6,110,116 | A * | 8/2000 | Wright | G01S 7/52023 |
| | | | | 600/447 |
| 6,172,939 | B1 * | 1/2001 | Cole | G01S 7/52017 |
| | | | | 367/138 |
| 6,648,826 | B2 * | 11/2003 | Little | G01S 7/5203 |
| | | | | 600/457 |
| 7,502,278 | B1 * | 3/2009 | Imbornone | G01S 3/801 |
| | | | | 367/103 |
| 7,512,037 | B2 * | 3/2009 | Frodyma | G01S 7/003 |
| | | | | 367/134 |
| 8,989,238 | B2 * | 3/2015 | Best | G06F 13/4072 |
| | | | | 375/219 |
| 9,106,400 | B2 * | 8/2015 | Cheng | H04L 7/0335 |
| 2007/0070814 | A1 * | 3/2007 | Frodyma | G01S 7/003 |
| | | | | 367/134 |
| 2007/0239013 | A1 | 10/2007 | Alexandru | |
| 2008/0262351 | A1 | 10/2008 | Scampini | |
| 2013/0109968 | A1 * | 5/2013 | Azuma | A61B 8/5269 |
| | | | | 600/441 |
| 2017/0146643 | A1 * | 5/2017 | Nestler | A61B 8/06 |

* cited by examiner

FIG. 12

ULTRASOUND SUB-ARRAY RECEIVER BEAMFORMER

CROSS-REFERENCE TO RELATED APPLICATIONS

This claims priority benefit to all common subject matter of U.S. Provisional Patent Application Ser. No. 62/150,802 filed Apr. 21, 2015. The content of this application is incorporated herein by reference in its entirety.

TECHNICAL FIELD

This disclosure relates to ultrasound sub-arrays, more particularly to dynamic focus and apodization of ultrasound receiver sub-arrays.

BACKGROUND

The rapidly advancing technology for medical imaging devices is a hallmark of modern health services that is improving the lives of many. The rapidly growing market for ultrasound devices represents one of the largest potential market opportunities for next generation medical imaging.

These devices have unique attributes that have significant impacts on manufacturing integration, in that they must be generally small, power efficient, and operate at high speed and they must be produced in high volumes at relatively low cost.

As an extension of the medical imaging industry, the ultrasound industry segment has witnessed ever-increasing commercial competitive pressures, along with growing consumer expectations and the diminishing opportunities for meaningful product differentiation in the marketplace. Future medical imaging systems will be more capable, have higher resolution, use less power, and operate at higher speed, while being manufactured at lower cost than today.

There have been many approaches to addressing the advanced manufacturing requirements of medical imaging devices and many industry road maps have identified significant gaps between the current medical imaging technologies and customer demands. One approach taken in ultrasound imaging technologies is to transmit acoustic energy into a patient's body and receive the reflected acoustic signals with independent transducer elements.

The transducer elements are typically arranged as an array of piezoelectric transducers that typically range from sixty-four transducer elements to over one hundred-twenty-eight transducer elements. The transducer elements convert the received acoustic energy into electrical signals. In a traditional ultrasound system, the signals from each of the transducer elements are amplified and converted from an analog signal to a digital signal.

Once the signals from the transducer are converted into a digital signal, a digital beamformer is used to interpolate, dynamically delay and sum the digital signals. Interpolating, delaying, and summing are used to dynamically focus and steer the receive beam over a receive interval in order to create an image line.

In addition to focusing and steering the receive beam, the beamformer also apodizes, or weighs, the signals from each transducer element as a function of time during the receive interval. Apodization can provide a constant F#, which is focal length divided by aperture. The aperture being the distance spanned by active transducer elements.

Apodization can further provide the ability to window the signals using a windowing function, such as a raised cosine function, a Hamming function, or a Hanning function. Windowing the signal is used to reduce sidelobes of the signal.

This approach is large and excessively power hungry at least because the signal from each transducer element was converted from an analog signal to a digital signal with an analog to digital converter (ADC) for each signal. This required one ADC for each signal, or upwards of sixty-four ADCs.

An alternative approach implemented sub-arrays of the transducer elements and combined some of the processing of the signals. The sub-array architecture differed from the independent transducer element architecture, described above, in that some of the signals could be grouped and partially delayed and summed while in an analog domain before the signal is converted to digital.

The transducer elements used in the sub-array architecture are commonly adjacent to each other. Because of this, the maximum delay required to focus the signals across the transducer elements in the sub-array is limited to a delay that can be achieved using an analog technique.

The analog signals are delayed and summed to produce a beamformed sub-array output. In many approaches the analog delays are fixed producing a fixed focus which compromises image quality.

In other approaches, the analog delays can be changed during the receive interval to maintain dynamic focus. The beamformed sub-array output is then converted to digital in an ADC. The outputs, of multiple ADCs for multiple sub-arrays, are then digitally delayed, and digitally summed to complete the focusing.

The advantages to this approach are that the analog delay can be accomplished using significantly less power and in a smaller space than by using ADCs for each signal and doing all the beamforming digitally. The number of power hungry ADCs is reduced by the number of channels in the sub-array.

This approach, however, only provided a partial solution in that communication of delay information proved a major limitation. The limitation arose due to a need to supply significant delay information to a receive beamformer integrated circuit (IC) during the receive interval or during the time in between imaging lines (when the signals are not being received).

It has been shown that IC to IC communication activity in the receiver needs to be avoided as switching logic has proven to produce both radiated and conducted RF signals that are picked up by the receiver and produce image artifacts. Alternately, writing significant delay information to the IC in between imaging lines is problematic as it increases the time in between image lines and decreases the image frame rate to unacceptable levels.

Another problem with this approach arose when attempting to "step" or "walk" the aperture across the available transducer elements. The imaging aperture is typically a contiguous number of transducer elements that is less than the total number of available transducer elements.

As an illustrative example, the total number of transducer elements may be one hundred-twenty-eight, while the imaging aperture could consist of only thirty-two transducer elements. With a thirty-two transducer element aperture, for each image line in an image frame, the system transmits and receives on thirty-two of the total one hundred-twenty-eight transducer elements.

In order to image multiple lines to create an image, the aperture is stepped across the available transducer elements by dropping one transducer element from one side of the aperture and adding another transducer element to the other side. In this way, the aperture is walked across the available transducer elements for each successive image line.

With a receiver having the transducer elements arranged in a sub-array architecture, stepping the aperture across the available elements in this fashion is problematic. As the imaging aperture is walked across the available transducer elements the alignment of the sub-arrays within the aperture will shift from line to line as the aperture includes partial sub-arrays.

This creates many problems. One of which is the inability of the system to dynamically apodize during the receive interval in the digital domain. That is, this approach cannot maintain the same F# during the receive interval by dynamically increasing the receive aperture digitally. A further problem is that it is shown to cause slight shifts in focus from line to line in the near field that will repeat every four lines and will most likely be visible as an artifact in the image.

In view of the ever-increasing commercial competitive pressures, along with growing consumer expectations and the diminishing opportunities for meaningful product differentiation in the marketplace, it is critical that answers be found for these problems. Additionally, the need to reduce costs and size, improve efficiencies and performance, and meet competitive pressures adds an even greater urgency to the critical necessity for finding answers to these problems.

Thus, a need remains for smaller, more efficient, and more effective dynamic focusing and apodizing ultrasound receivers. Solutions to these problems have been long sought but prior developments have not taught or suggested any adequate solutions and, thus, solutions to these problems have long eluded those skilled in the art.

SUMMARY

A sub-array receiver beamformer system and methods, enabling effective and efficient dynamic focusing and apodization for phased array and linear transducers, are disclosed that require significantly less power, memory, size, and complexity. The sub-array receiver beamformer system and methods can include: transducer elements arranged in a sub-array for generating analog signals based on a return signal detected by the transducer elements during a receive interval; analog delay lines including individual delays unique to each of the transducer elements and calculated based on a linear delay slope for delaying the analog signals; an analog to digital converter for converting the analog signals to a digital signal; a digital beamformer with a digital delay based on one portion of the linear delay slope for delaying the digital signal; and a profile control register containing depth bits corresponding to multiple points for updating the linear delay slope during the receive interval to adjust for the multiple points within an image line.

It has been discovered that embodiments of the sub-array receiver beamformer system can maintain receive focus by using a limited number of linear delay profiles across the channels of each sub-array that are updated as a function of time. The required focusing delay profiles can be applied during receive intervals and stored in the device using minimal memory for each of the image lines for a full imaging frame eliminating the need to write to the device during the receive interval or transferring a significant amount of data in between imaging lines.

It has been further discovered that embodiments of the sub-array receiver beamformer system can enable down stream digital dynamic apodization by implementing input channel switching to maintain the same relative position of sub-arrays within the active imaging aperture as the elements are walked across the transducer. This allows digital dynamic apodization in the digital domain on the outputs of each sub-array. It also allows identical focusing from line to line eliminating artifacts and also allows the same focusing data to be used on 4 consecutive lines.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The sub-array receiver beamformer is illustrated in the figures of the accompanying drawings which are meant to be exemplary and not limiting, in which like reference numerals are intended to refer to like components, and in which.

DETAILED DESCRIPTION

In the following description, reference is made to the accompanying drawings that form a part hereof, and in which are shown by way of illustration, embodiments in which the sub-array receiver beamformer may be practiced. It is to be understood that other embodiments may be utilized and structural changes may be made without departing from the scope of the sub-array receiver beamformer.

The sub-array receiver beamformer is described in sufficient detail to enable those skilled in the art to make and use the sub-array receiver beamformer and provide numerous specific details to give a thorough understanding of the sub-array receiver beamformer; however, it will be apparent that the sub-array receiver beamformer may be practiced without these specific details. The sub-array receiver beamformer is described with regard to a four channel sub-array with a four-to-one multiplexer for descriptive clarity only and is not intended to be so limited unless expressly claimed.

In order to avoid obscuring the sub-array receiver beamformer, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs.

Figure 1:
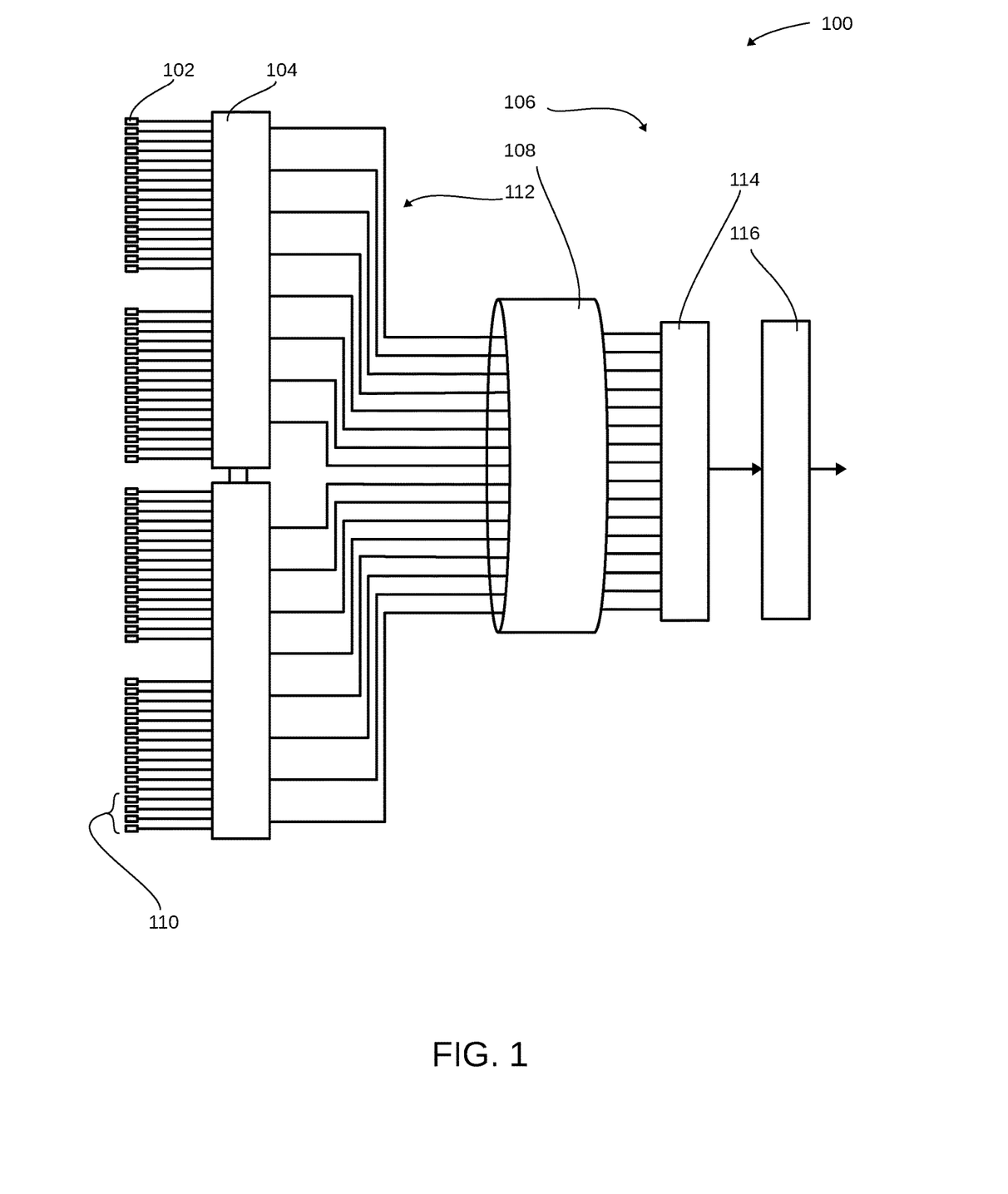
FIG. 1 is a block diagram of ultrasound receiver components.

Referring now to FIG. 1, therein is shown a block diagram of ultrasound receiver components 100. The ultrasound receiver components 100 are shown including transducer elements 102 and sub-array receiver beamformer ICs 104 coupled to post sub-array receiver electronics 106 with a cable 108.

It is contemplated that the transducer elements 102 and the sub-array receiver beamformer ICs 104 can be located within a transducer probe while the post sub-array receiver electronics 106 can be located remotely. Alternatively, it is contemplated that the transducer elements 102, the sub-array receiver beamformer ICs 104, and the post sub-array receiver electronics 106 can be arranged within a transducer probe.

The transducer elements 102 are shown arranged in a 64 channel array. The transducer elements 102 are coupled to the sub-array receiver beamformer ICs 104 and can be grouped in sub-arrays 110 of four transducer elements 102. The sub-array receiver beamformer ICs 104 can be two 32 channel beamformer ICs coupled together.

The sub-array receiver beamformer ICs 104 can include sub-array beamformer outputs 112 that pass through the cable 108. The sub-array beamformer outputs 112 are depicted as sixteen sub-array beamformer outputs 112, one for each of the sub-arrays 110 that has been sampled, delayed, and summed by the sub-array receiver beamformer ICs 104.

The sub-array beamformer outputs 112 can be connected from the sub-array receiver beamformer ICs 104 to the post sub-array receiver electronics 106. The post sub-array receiver electronics 106 can include a post sub-array receiver 114 coupled to a digital beamformer 116.

It is contemplated that the post sub-array receiver 114 can be a 16 channel receiver and is contemplated to include low noise amplifiers, variable gain amplifiers, and ADCs. The digital beamformer 116 is contemplated to provide digital delays to the signals from the sub-array beamformer outputs 112 in the digital domain.

Further it is contemplated that the digital beamformer 116 can have a resolution of 1/16 of a wavelength (λ). λ can be the inverse of the transducer elements 102 center frequency (F0), that is 1/F0.

Figure 2:
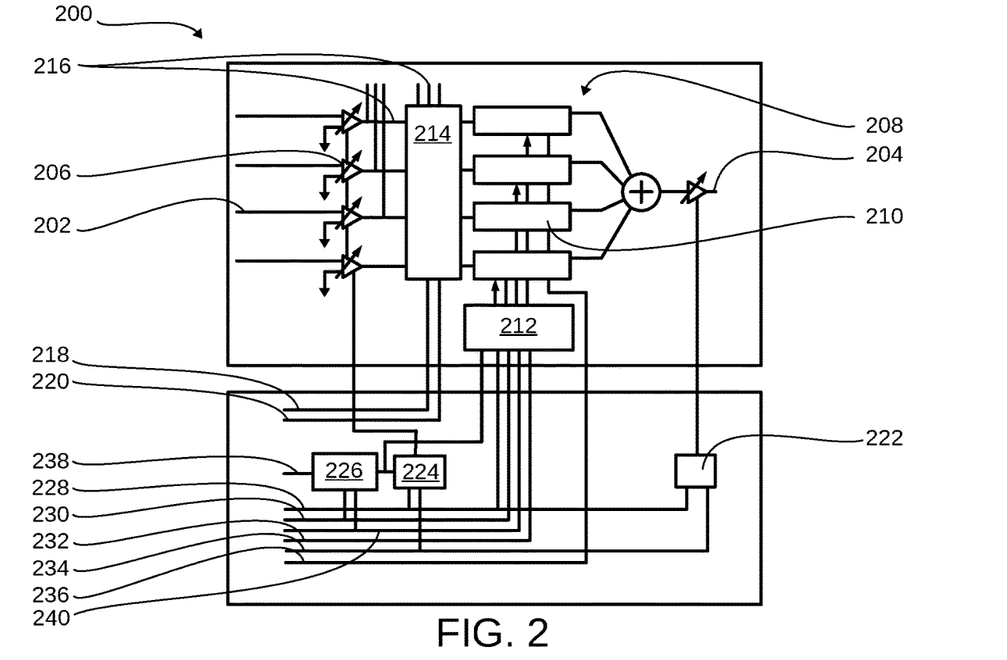
FIG. 2 is a block diagram of a sub-array receiver beamformer.

Referring now to FIG. 2, therein is shown a block diagram of a sub-array receiver beamformer 200. The sub-array receiver beamformer 200 can be a component or functional block within the sub-array receiver beamformer ICs 104 of FIG. 1.

It is contemplated that each of the sub-array receiver beamformer ICs 104 can include 8 of the sub-array receiver beamformers 200, one sub-array receiver beamformer 200 for each of the sub-arrays 110 of FIG. 1. The sub-array receiver beamformer 200 is shown having four inputs 202 corresponding to the four transducer elements 102 of FIG. 1 of the sub-arrays 110.

The sub-array receiver beamformer 200 is further depicted having one summed beamformed output 204. The inputs 202 are shown coupled to variable gain low noise amplifiers (VGLNAs 206).

The VGLNAs 206 can buffer the input signals from the transducer elements 102 and amplify them sufficiently to match the available dynamic range of an analog delay line 208. It is contemplated that the analog delay line 208 can include four channels 210 corresponding to a single four transducer element sub-array.

It is contemplated that the analog delay line 208 can be implemented using analog random access memory (RAM). The analog delay line 208 using the analog RAM can result in a high dynamic range programmable sampled analog delay line with a maximum delay of 1.5λ and a focus resolution of λ/16. It has been discovered that implementing the analog delay line 208 with the analog RAM enables dynamic focusing of the signals from the transducer elements 102, across the sub-arrays 110, which can be achieved using simplified programmable delay profiles that are changed at programmable times during the receive interval.

The analog RAM of the analog delay line 208 can be used to provide the delays to each of the channels 210 and can be implemented as sampled capacitors, which can be sampled at a rate sufficient to provide the λ/16 resolution. The maximum delay provided by the analog RAM of the analog delay line 208 can be dependent on the depth of the analog RAM and can determine the maximum F# and steering angle for the acoustic beam that can be supported.

As an illustrative example, a maximum delay of 1.5λ could be sufficient for a wide variety of transducers and could result in a focus resolution of λ/16. To achieve the maximum delay of 1.5λ, the analog RAM depth should be 24 samples, that is 24 samples of the analog RAM at a λ/16 sample rate would result in a 1.5λ delay.

Five profile bits can therefore be used to set the analog RAM depth for each of the channels 210 in the analog delay line 208 to control the delay profile for each of the sub-arrays 110. The delay profile can be used to determine the individual delays for each of the channels 210, which can be communicated from the sub-array delay controller 212 to the analog delay line 208.

The VGLNAs 206 are depicted as dedicated to one of the inputs 202. The VGLNAs 206 are coupled to a sub-array aperture shift multiplexer 214. The sub-array aperture shift multiplexer 214 can be coupled between the VGLNAs 206 and the analog delay line 208.

As will be discussed below with regard to FIG. 11, in one contemplated embodiment, the sub-array aperture shift multiplexer 214 can be coupled to the outputs of the VGLNAs 206 for seven of the transducer elements 102 with VGLNA outputs 216. The sub-array aperture shift multiplexer 214 further includes a shift 0 218 and a shift 1 220 input for shifting an aperture and the sub-arrays 110 across the transducer elements 102.

In one contemplated embodiment the sub-array receiver beamformer 200 including the VGLNAs 206, the sub-array aperture shift multiplexer 214, the analog delay line 208, and the sub-array delay controller 212 are dedicated to one of the sub-arrays 110. The sub-array receiver beamformer ICs 104 can include common elements that can be common for all the sub-array receiver beamformers 200 on the sub-array receiver beamformer ICs 104.

The common elements can include an output gain controller 222, a time gain controller 224, and a depth counter 226. The time gain controller 224 can be coupled to and control the VGLNAs 206. The depth counter 226 can be coupled to the time gain controller 222 and can increment a count at a multiple of the F0 of the transducer elements 102.

The depth counter 226 can further be coupled to the sub-array delay controller 212. The shift 0 218 and the shift 1 220 inputs to the sub-array aperture shift multiplexer 214 can be common for the sub-array receiver beamformer ICs 104 along with inputs for a serial peripheral interface (SPI 228), a 4xF0 clock 230, a line number 232, a line type 234, and a 16xF0 clock 236.

The 4xF0 clock 230 can be an input to the depth counter 226 and the sub-array delay controller 212. The depth counter 226 can further have a line start 238 and a reset 240 as inputs.

Figure 3:
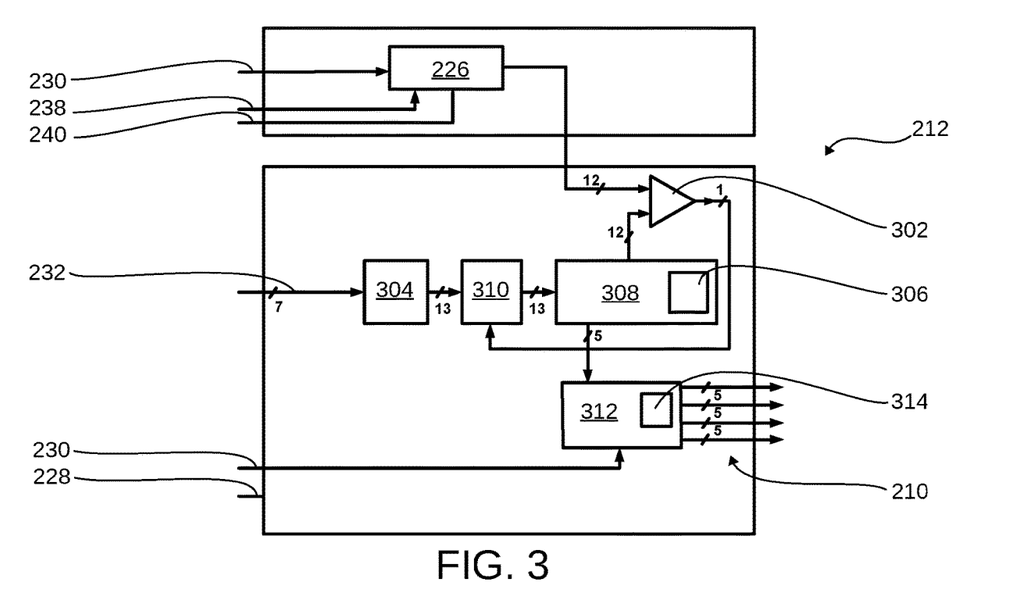
FIG. 3 is a block diagram of the sub-array delay controller of FIG. 2.

Referring now to FIG. 3, therein is shown a block diagram of the sub-array delay controller 212 of FIG. 2. The sub-array delay controller 212 is shown coupled to the depth counter 226 common to all the sub-arrays 110 of FIG. 1.

The depth counter 226 is depicted having the line start 238, the reset 240, and the 4xF0 clock 230 as inputs. The sub-array delay controller 212 is shown having a digital comparator 302 coupled to the depth counter 226.

The sub-array delay controller 212 is further shown having an initial slope control 304. The initial slope control 304 can be an address generator for pointing to a specific delay profile control register 306 within a delay profile control memory 308 using the line number 232 as an input.

The delay profile control register 306 can be used to control dynamic delay profile adjustments. Each of the delay profile control registers 306 can contain 17 bits, 12 depth bits that determine the depth for a specific delay profile, and 5 profile bits that determine which of up to 32 delay profiles will be applied at that depth.

It is contemplated that the 32 channel sub-array receiver beamformer ICs 104 of FIG. 1 can include a total of 32,768 of the delay profile control registers 306, assuming 32 delay profile control registers 306 per line and sufficient memory for up to 256 unique lines. That is, each of the sub-array delay controllers 212 assigned to a sub-array 110 can contain a total of 8192 delay profile control registers 306.

It is further contemplated that each of the sub-arrays 110 can have 32 of the delay profile control registers 306 assigned to a single image line. The line number 232 is contemplated to point to these 32 delay profile control registers 306 for the image line and the sub-array 110.

The 12 depth bits of the delay profile control registers 306 can be used to identify when, during the receive interval, the delay profile should be updated. It is contemplated that the 12 depth bits of the delay profile control registers 306 can be output from the delay profile control memory 308 and can be compared against the output of the depth counter 226 within the digital comparator 302.

It has been discovered that programming the delay profile control memory 308 using the SPI 228 can be sped up by providing the delay profile control registers 306, for each image line, with a separate address on the SPI 228, and writing directly into the delay profile control registers 306 eliminating the need to address each of the delay profile control registers 306 separately. As a result, the number of addresses necessary to address the delay profile control registers 306 could be reduced to 1024 for every delay profile control register 306 within the sub-array receiver beamformer ICs 104. Each of the addresses can represent 32 resisters, 17 bits in length, leaving the data word for each of the addresses 544 bits long.

In one contemplated embodiment, the output of the digital comparator 302 can be fed into a digital adder 310. The digital adder 310 can be coupled between the initial slope control 304 and the delay profile control memory 308.

The digital adder 310 can increment through the delay profile control registers 306 that are pointed to during the receive interval. The delay profile control register 306 that is being pointed to will have the 12 depth bits corresponding to the 5 profile bits.

As was previously described, the delay profile control register 306 that is pointed to will be used to output the 12 depth bits to the digital comparator 302. The 5 profile bits of the delay profile control register 306 that are being pointed to will be output to a delay latch 312.

The delay latch 312 can include a look up table 314 that can match a slope of the delay profile, indicated by the 5 profile bits output from the delay profile control memory 308, with 5 delay bits. The 5 delay bits can be generated for each of the channels 210 of FIG. 2. The 5 delay bits can set the analog RAM depth for the number of samples required to produce the individual delay for each of the channels 210 in the analog delay line 208 of FIG. 2.

Figure 4:
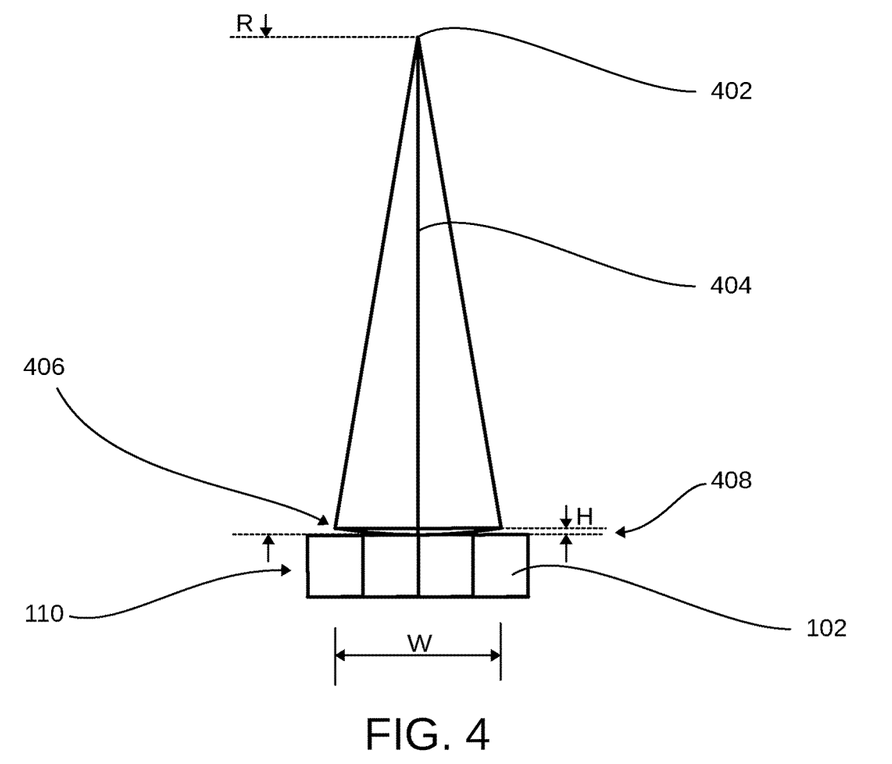
FIG. 4 is a graphical illustration of a focal point along an image line in relation to one of the sub-arrays of FIG. 1.

Referring now to FIG. 4, therein is shown a graphical illustration of a focal point 402 along an image line 404 in relation to one of the sub-arrays 110 of FIG. 1. A return signal 406 is depicted as a waveform radiating out spherically away from the focal point 402.

It can be seen that the return signal 406 impacts the center two transducer elements 102 of the sub-array 110 before the outer two transducer elements 102 of the sub-array 110.

It has been discovered that making the simplifying assumption that the delay profile is linear across the four transducer elements 102 of the sub-array 110, reduces the complexity and memory requirements for a sub-array delay controller and the sub-array delay controller 212 of FIG. 2 can be developed therefrom.

The simplifying assumption of a linear delay profile can be validated by determining how close the focal point 402 can be to the sub-array 110 before an error 408, proportional to the minimum focus resolution of $\lambda/16$, is incurred at the two outer transducer elements 102 of the sub-array 110. The minimum distance from the focal point 402 to the sub-arrays 110 before a maximum delay error is incurred at the two outer transducer elements 102 of the sub-arrays 110 can be described by Equation 1 as:

$$R = \frac{H}{2} + \frac{W^2}{8H} \qquad \text{Equation 1}$$

Equation 1 can be an equation for calculating the radius (R) of a circle knowing the width (W) and height (H) of a segment of the circle. The radius R that will result in a height $H=\lambda/16$ with a width $W=3\lambda/2$, is approximately $4.5\lambda$.

As an illustrative example, a transducer operating at 2.5 MHz can have a distance from the focal point 402 to the sub-array 110 of greater than 0.278 cm before the error 408 of $\lambda/16$ is reached. This can result in focal point 402 distances greater than 0.278 cm, the focus error assuming a linear delay slope will be less than $\lambda/16$.

As a further illustrative example, a transducer operating at 5 MHz can have a distance from the focal point 402 to the sub-array 110 of greater than 0.139 cm before the error 408 of $\lambda/16$ is reached. This can result in focal point 402 distances greater than 0.139 cm, the focus error assuming a linear delay slope will be less than $\lambda/16$.

Figure 5:
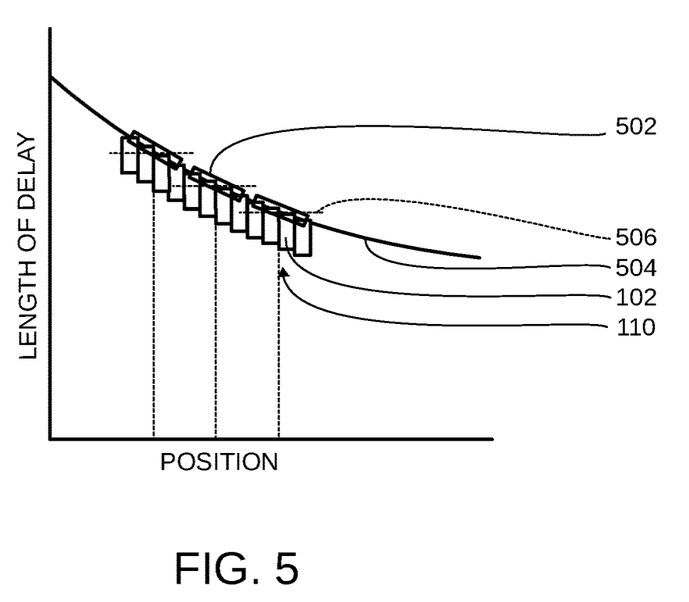
FIG. 5 is a graphical illustration of linear delay slopes for three of the sub-arrays of FIG. 1.

Referring now to FIG. 5, therein is shown a graphical illustration of linear delay slopes 502 of FIG. 5 for three of the sub-arrays 110 of FIG. 1. The transducer elements 102 are shown staggered in the vertical dimension according to the length of delay needed to maintain focus with the focal point 402 of FIG. 4.

The transducer elements 102 are shown arranged laterally according to their position within a transducer array. The linear delay slopes 502 can be used to delay the channels 210 of FIG. 2 in the analog delay line 208 of FIG. 2 while in the analog domain.

As can be seen, each of the sub-arrays 110 can be assigned an individual one of the linear delay slopes 502 and each of the transducer elements 102 within the sub-arrays 110 can be delayed according to the linear delay slopes 502 rather than being delayed according to an optimal delay curve 504.

It is contemplated that the delay profile control registers 306 of FIG. 3 for the sub-array delay controller 212 of FIG. 2 can include the linear delay slopes 502 identified by the 5 profile bits. After the sub-array receiver beamformer 200 of FIG. 2 implements the linear delay slopes 502 to the sub-arrays 110 in the analog domain, the digital beamformer 116 of FIG. 1 can calculate a digital delay 506 and compensate with the digital delay 506 from the centers of the sub-arrays 110 since the linear delay slopes 502 pivot around this point.

It has been discovered that compensating the sub-arrays 110 with the linear delay slopes 502 in the analog domain greatly reduces the power consumption, size requirements, memory requirements, and digital processing requirements because conceptually the linear delay slopes 502 reduce a transducer with 64 elements facing perpendicular to the transducer face to a virtual transducer with only 16 elements that are 4× the size and tilted such that the face of the elements point in the direction of the receive focal point.

Figure 6:
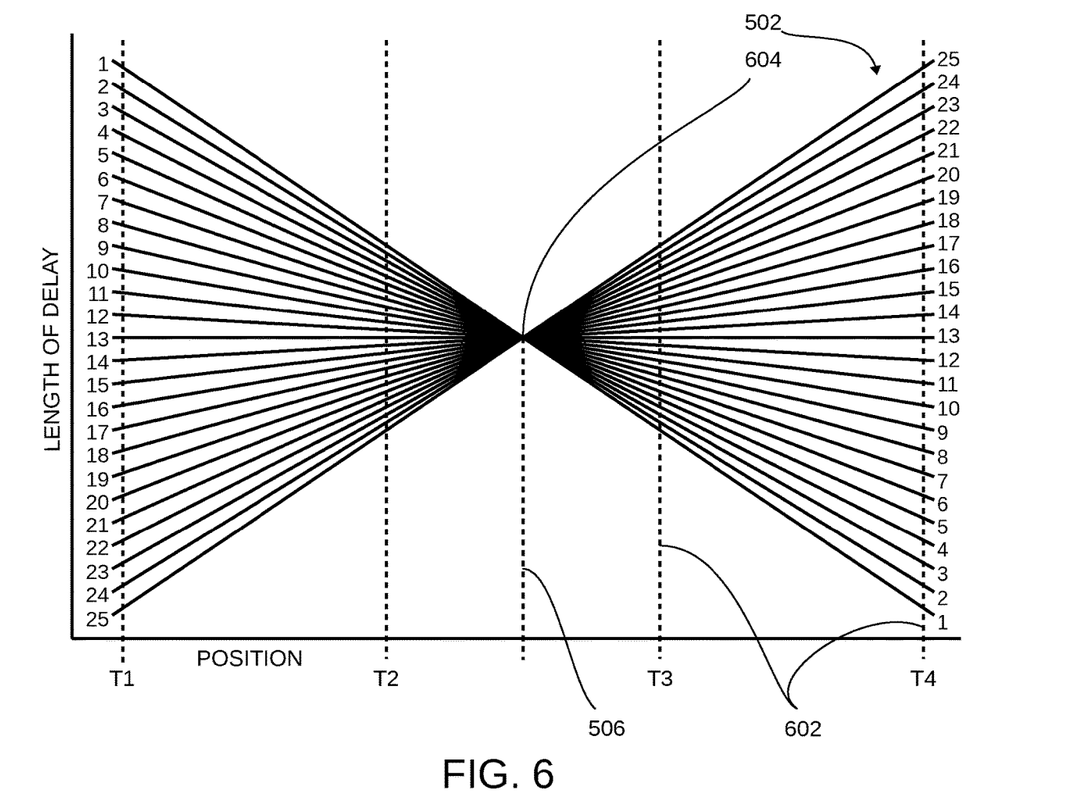
FIG. 6 is a graphical illustration of the linear delay slopes of FIG. 5.

Referring now to FIG. 6, therein is shown a graphical illustration of the linear delay slopes 502 of FIG. 5. Continuing with the example above having a λ/16 delay minimum resolution and a maximum delay of 1.5λ, a total of 25 possible linear delay slopes 502 would be required and can be seen labeled 1-25.

The linear delay slopes 502 are shown graphically depicted with the length of the delay in the vertical axis and the position of the transducer elements 102 of FIG. 1 along the horizontal axis. It is contemplated that one of the linear delay slopes 502 can be assigned to all four of the transducer elements 102 and provide the individual delays 602 for a transducer element T1, a transducer element T2, a transducer element T3, and a transducer element T4.

It can be seen that the digital delay 506 of FIG. 5, that can be added with the digital beamformer 116 of FIG. 1, can be calculated from the pivot point 604 of the linear delay slopes 502, which is positioned between the transducer element T2 and the transducer element T3. As an illustrative example, when the focal point 402 of FIG. 4 is relatively near, the linear delay slope 502 can be more extreme and could result in the 22nd linear delay slope 502 being assigned to the sub-arrays 110 of FIG. 1 containing the transducer element T1, the transducer element T2, the transducer element T3, and the transducer element T4.

When the 22nd linear delay slope 502 is assigned to the transducer elements 102 it can be seen that the transducer element T1 will have a relatively short individual delay 602, the transducer element T2 will have a longer individual delay 602 than the transducer element T1. The transducer element T3 will have a longer individual delay 602 than both the transducer element T1 and the transducer element T2, while the transducer element T4 will have the longest individual delay 602 in the sub-array 110.

The individual delays 602 for each of the transducer elements 102 will be summed in the sub-array receiver beamformer 200 of FIG. 2 and will be output as the sub-array beamformer outputs 112 of FIG. 1. The sub-array beamformer outputs 112 will be converted to the digital domain in the post sub-array receiver 114 of FIG. 1 and further processed to include the digital delay 506 in the digital beamformer 116 calculated from the pivot point 604.

Figure 7:
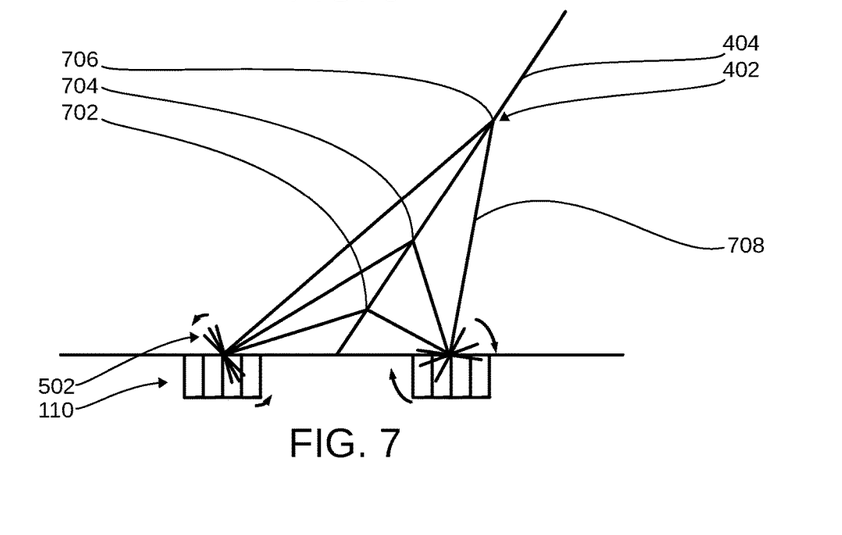
FIG. 7 is a graphical illustration of the linear delay slopes of FIG. 5 for two of the sub-arrays of FIG. 1 for multiple focal points of FIG. 4 along the image line of FIG. 4.

Referring now to FIG. 7, therein is shown a graphical illustration of the linear delay slopes 502 of FIG. 5 for two of the sub-arrays 110 of FIG. 1 for multiple focal points 402 of FIG. 4 along the image line 404 of FIG. 4. The image line 404 is shown having a close focal point 702, an intermediate focal point 704, and a far focal point 706.

As the return signal 406 of FIG. 4 is detected by the sub-arrays 110, the close focal point 702 can be the first focal point 402 detected on the image line 404. The intermediate focal point 704 can be the next focal point 402 detected on the image line 404 and the far focal point 706 can be the last focal point 402 detected on the image line 404.

As the focal points 402 get further from the sub-arrays 110 over time, the linear delay slopes 502 can be updated for each sub-array 110. It is contemplated that the linear delay slopes 502 can be updated for each of the sub-arrays 110 to remain orthogonal or perpendicular to a signal path 708 of the return signal 406.

The signal path 708 can be the path of the return signal 406 from the focal point 402 to the pivot point 604 of FIG. 6 at the center of the sub-arrays 110.

It is depicted that the left of the sub-arrays 110 includes the linear delay slopes 502 that rotate counter-clockwise as the focal points 402 move further away along the image line 404. The linear delay slopes 502 can start with a large negative slope that rotates counter-clockwise with time as the focal point 402 shifts from the close focal point 702 to the far focal point 706.

It is further depicted that the right of the sub-arrays 110 includes the linear delay slopes 502 that rotate clockwise as the focal points 402 move further away along the image line 404. The linear delay slopes 502 can start with a large positive slope that rotates clockwise with time as the focal point 402 shifts from the close focal point 702 to the far focal point 706.

It is contemplated that the linear delay slopes 502 for each of the sub-arrays 110 over the receive interval for one image line 404 never repeat. It has been discovered that since the linear delay slopes 502 for each of the sub-arrays 110 can be a limited number of values that monotonically increase or decrease and do not repeat during a receive interval of an image line 404, then an initial value of the linear delay slope 502, incremented or decremented at the proper time for each focal point 402, can be used to dynamically focus an individual sub-array 110. This can greatly reduce the power, memory, and processing requirements.

Figure 8:
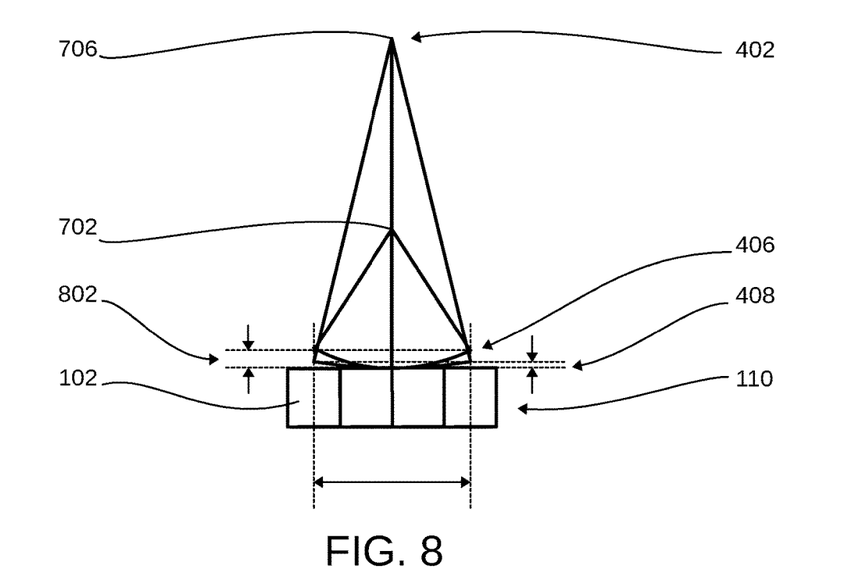
FIG. 8 is a graphical illustration of two focal points of FIG. 4 in relation to one of the sub-arrays of FIG. 1.

Referring now to FIG. 8, therein is shown a graphical illustration of two focal points 402 of FIG. 4 in relation to one of the sub-arrays 110 of FIG. 1. The return signal 406 is shown for each of the focal points 402.

The return signal 406 from the far focal point 706 can result in the acceptable error 408 of less than λ/16, while the return signal 406 from the close focal point 702 can result in the unacceptable error 802 of greater than λ/16.

It can be appreciated that the far focal point 706 can be further than 4.53λ from the sub-arrays 110, which will result in the error 408 of λ/16 or less at the two outer transducer elements 102. On the other hand, the close focal point 702 is depicted closer than 4.53λ from the sub-arrays 110, which will result in the error 802 of greater than λ/16 at the two outer transducer elements 102.

Illustratively, when the maximum acceptable error is λ/16, the unacceptable error 802 can result when the close focal point 702 is less than 4.53λ away from the sub-arrays 110, which can be 0.28 cm at F0=2.5 MHz. It is contemplated that when the distance of the close focal point 702 to the sub-arrays 110 results in the unacceptable error 802 at the outer transducer elements 102, a "bow correction" can be added to the linear delay slopes 502 of FIG. 5.

It is shown that the error 802 can be $3\lambda/16$ for the outer transducer elements 102 while the error for the inner transducer elements 102 is still relatively small. It is contemplated that the "bow correction" can be used to bow the linear delay slopes 502 and correct the individual delay 602 of FIG. 6 for the outer transducer elements 102 to avoid the unacceptable error 802.

For example, a 2-bit bow correction could be stored within the sub-array delay controller 212 of FIG. 2 and result in the individual delay 602 for the outer transducer elements 102 being corrected by $1\lambda$ to $3\lambda$. It has been discovered that storing and applying the bow correction adds only marginal complexity while appreciably improving image quality in the very near field.

Figure 9:
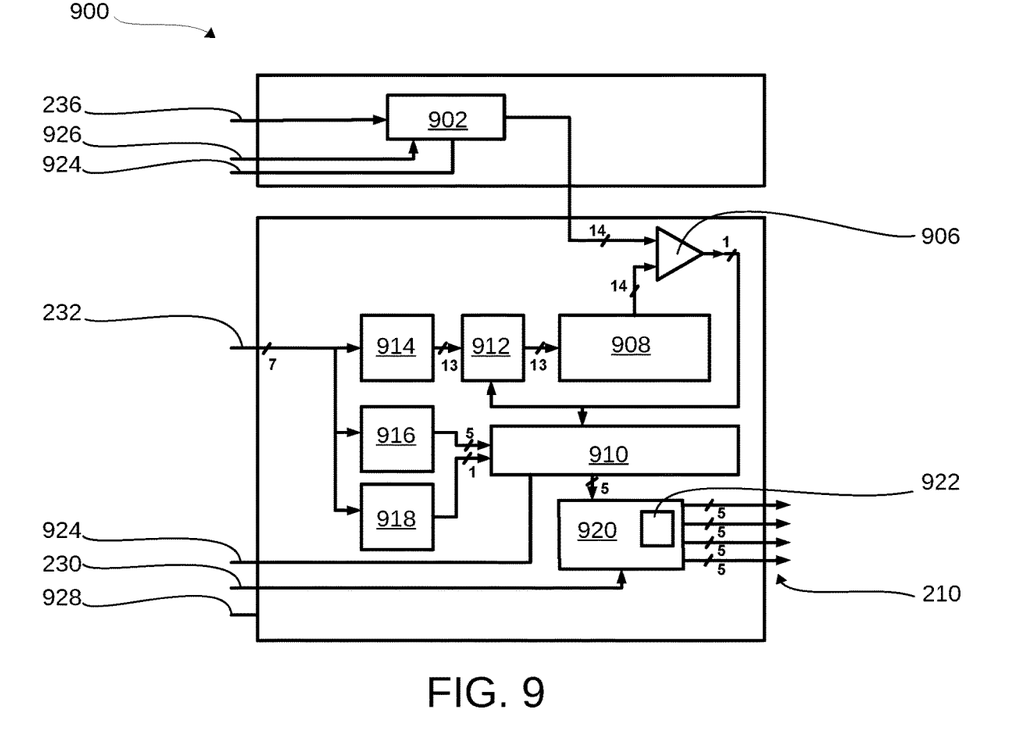
FIG. 9 is a block diagram of a sub-array delay controller of FIG. 2 in an alternative embodiment.

Referring now to FIG. 9, therein is shown a block diagram of a sub-array delay controller 900 similar to the sub-array delay controller 212 of FIG. 2 in an alternative embodiment. The sub-array delay controller 900 can include a depth counter 902 and the 16xF0 clock 236 clock input.

The depth counter 902 can be started at the beginning of the receive interval and can be used to determine when to increment or decrement the linear delay slopes 502 of FIG. 5. The output of the depth counter 902 can be coupled to a digital comparator 906. The digital comparator 906 can also be coupled to the output of a delay profile control memory 908.

The delay profile control memory 908 can be a memory containing the depth count values required to increment or decrement the linear delay slopes 502. When the digital comparator 906 determines that the output of the delay profile control memory 908 matches the output of the depth counter 902, the digital comparator 906 can provide an output to trigger an update of the linear delay slopes 502.

The update to the linear delay slopes 502 caused by the output of the digital comparator 906 can be an input to a slope counter 910. The slope counter 910 can monotonically increment or decrement through the linear delay slopes 502. The output of the digital comparator 906 can also increment a digital adder 912 that can be used to increment a memory read address counter and update the delay profile control memory's 908 output value to the digital comparator 906.

As an illustrative example, a maximum depth of 30 cm can be assumed for a 2.5 MHz transducer, which would require the depth counter 902 to have a maximum count of 15.6K or 14 bits because the depth counter 906 operates at 16xF0. Since F0 is contemplated to be 2.5 MHz, 16xF0 would be 40 MHz.

The propagation delay of sound in the human body is approximately 1540 m/sec or a 13µ sec round trip for 1 cm depth. Hence, a maximum of 25 words, 14 bits in length, could be used to program the linear delay slope 502 updates for a single sub-array 110 of FIG. 1 having four transducer elements 102 of FIG. 1 for a single image line 404 of FIG. 4. Words of 14 bits would be required to provide the required depth resolution for a 30 cm depth with a 2.5 MHz transducer assuming the 16xF0 clock rate of 40 MHz and a 1540 m/s speed of sound.

It should be noted that the digital beamformer 116 of FIG. 1 with the sub-array delay controller 900 of this embodiment should still have a resolution of at least $\lambda/16$. The digital adder 912 can include a memory read address input from an initial delay profile control memory address generator 914 that can generate a memory read address with the line number 232 input.

The line number 232 input can further be used in an initial slope module 916 to generate an initial 5 slope bits pointing to the linear delay slopes 502. The line number 232 input can also be used in a slope increment decrement module 918, which can output a single increment or decrement bit.

The output of the slope increment decrement module 918 and the initial slope module 916 can be used in the slope counter 910. The slope counter 910 can provide 5 slope bits to a delay latch 920. The delay latch 920 can include a look up table 922 that can match the slope of the linear delay slopes 502 indicated by the 5 slope bits with 5 delay bits. The 5 delay bits can indicate the individual delay 602 of FIG. 6 for each of the channels 210 of FIG. 2 in the analog delay line 208 of FIG. 2.

The delay latch 920 can be clocked by the 4xF0 clock 230 clock input. The slope counter 910 and the depth counter 902 can include a reset 924 input that can act as a load signal for the slope counter 910. The depth counter 902 can further include a line start 926 input. The sub-array delay controller 900 can include an SPI connection 928 for programming the sub-array delay controller 900.

Figure 10:
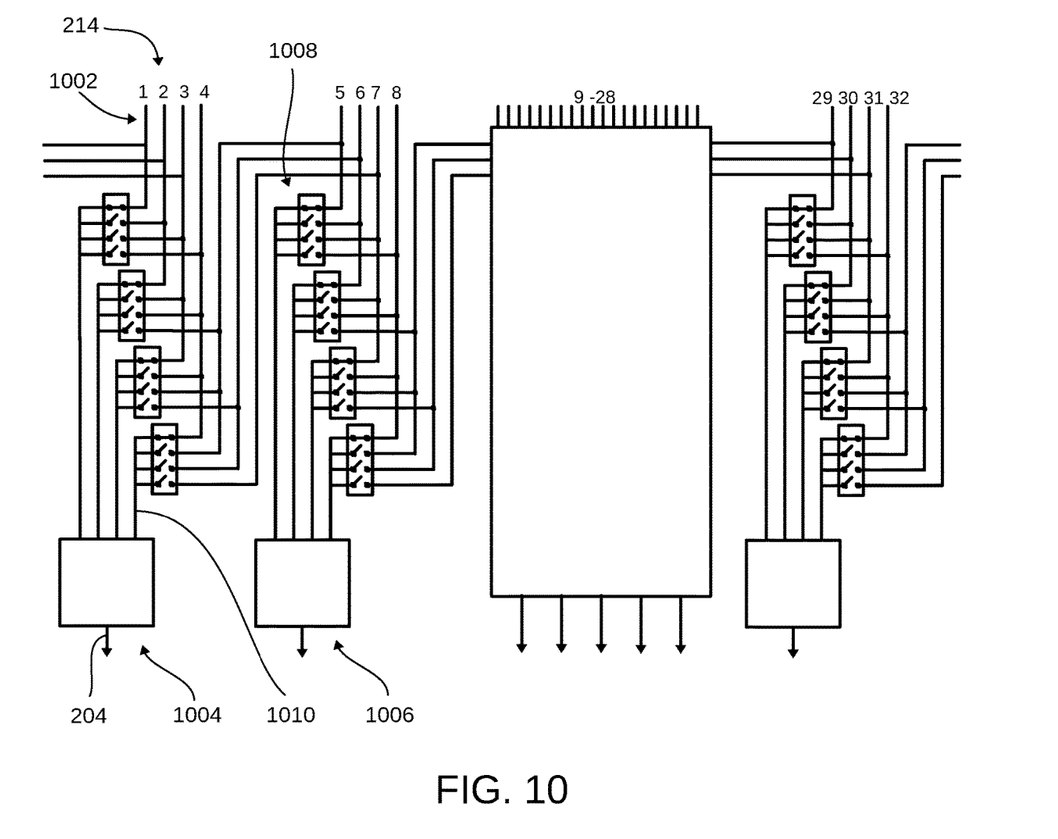
FIG. 10 is a block diagram of the sub-array aperture shift multiplexer of FIG. 2.

Referring now to FIG. 10, therein is shown a block diagram of the sub-array aperture shift multiplexer 214 of FIG. 2. The sub-array aperture shift multiplexer 214 is shown having inputs 1002 from each of the 32 transducer elements 102 of FIG. 1 buffered by the VGLNAs 206 of FIG. 2 for a single sub-array receiver beamformer IC 104 of FIG. 1.

The sub-array aperture shift multiplexer 214, for each of the sub-arrays 110 of FIG. 1, can include seven inputs 1002 from seven of the transducer elements 102. As can be seen, the inputs 1002 for a first sub-array 1004 can include the transducer elements 1-7, while a second sub-array 1006 can include the inputs 1002 from the transducer elements 5-11.

The sub-array aperture shift multiplexer 214 for each of the sub-arrays 110 is contemplated to include 4 switches 1008. The sub-array aperture shift multiplexer 214 includes switch outputs 1010 that can be summed and delayed to provide the summed beamformed output 204.

The sub-array aperture shift multiplexer 214 can include the inputs shift 0 218 of FIG. 2 and shift 1 220 of FIG. 2. The shift 0 218 and the shift 1 220 inputs can be used by the sub-array aperture shift multiplexer 214 to generate four states or position sequences within each group of four switches 1008.

The switches 1008 can logically shift the inputs 1002 to the sub-arrays 110 by 0, 1, 2, and 3 transducer elements 102. As can be seen, it is contemplated that every group of four switches 1008 within the sub-array aperture shift multiplexer 214 can have the same position sequence.

It is contemplated that the switches 1008 for each sub-array 110 can be configured as a 4:1 multiplexer, that is one of the four switches 1008 can be closed while the other three switches 1008 can be open for each state.

Figure 11:
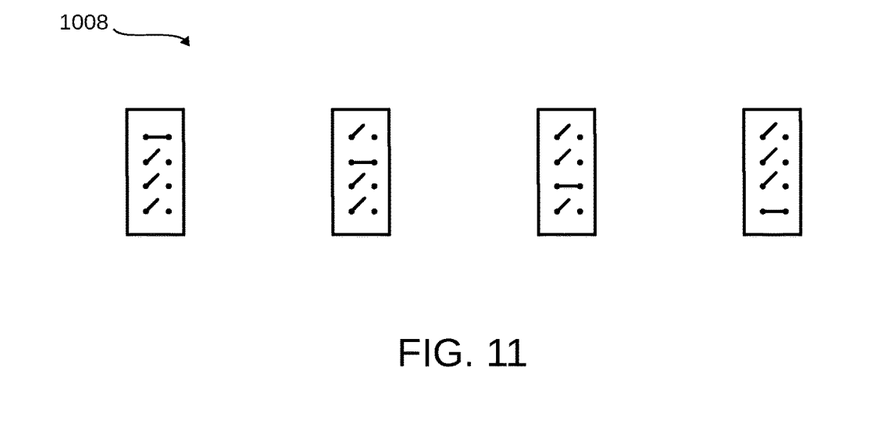
FIG. 11 is a graphical illustration of the switch states for the sub-array aperture shift multiplexer of FIG. 2.

Referring now to FIG. 11, therein is shown a graphical illustration of the switch 1008 states for the sub-array aperture shift multiplexer 214 of FIG. 2. The switches are shown in four states each having one of the switches 1008 closed and three switches 1008 open.

Figure 12:
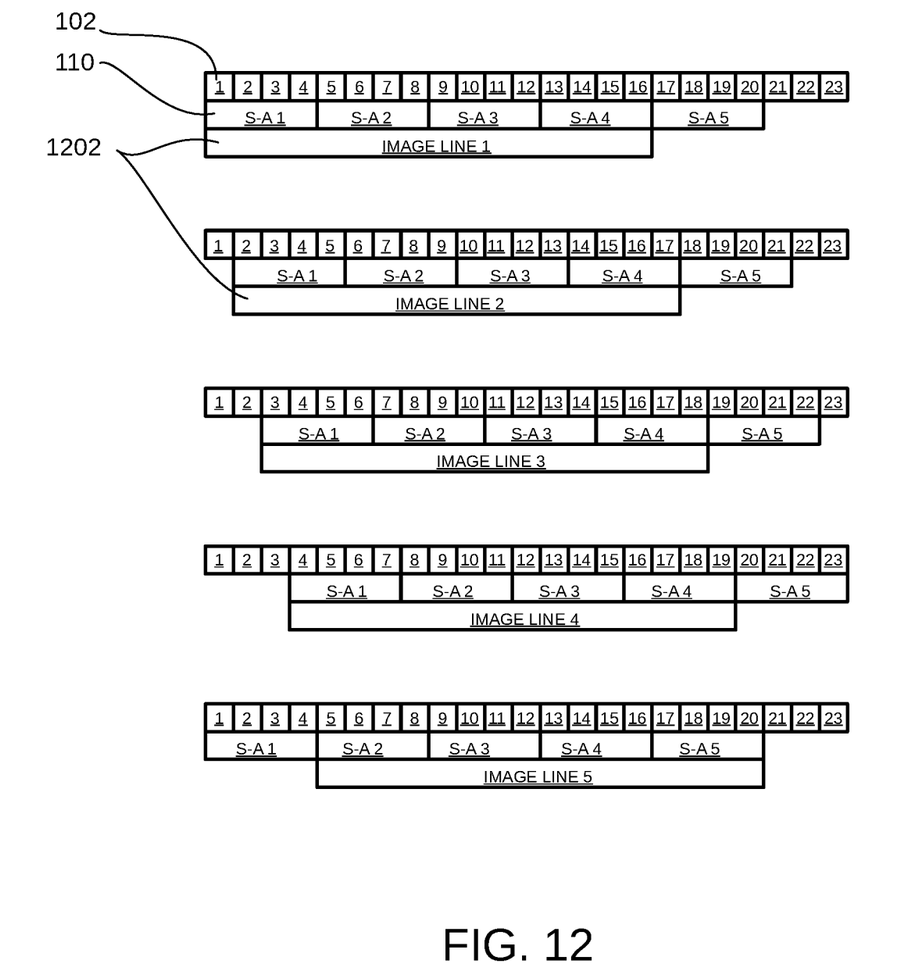
FIG. 12 is a graphical illustration of an aperture stepping across the transducer elements of FIG. 1 during five successive imaging lines of FIG. 4.

Referring now to FIG. 12, therein is shown a graphical illustration of an aperture 1202 stepping across the transducer elements 102 of FIG. 1 during five successive image lines 404 of FIG. 4. In each successive image line 404, the aperture 1202 can increment by one of the transducer elements 102.

It is contemplated that the sub-array aperture shift multiplexer 214 of FIG. 2 can align the sub-arrays 110 to the aperture 1202 in the same relative position as the aperture 1202 steps across the transducer elements 102. The aperture 1202 can be seen having a 16 transducer element 102 window aligned with 4 sub-arrays 110.

The aperture 1202 can be seen maintaining the same relative location with each of the sub-arrays 110 while stepping across the transducer elements 102 until four transducer elements 102 has been stepped through. Once 4 transducer elements 102 have been stepped through, the aperture 1202 can step or increment to the next sub-array 110.

It has been discovered that with the ability to align the sub-arrays 110 with the aperture 1202 as shown, dynamic receive apodization of the summed beamformed output 204 of FIG. 2 can be achieved with a resolution of 4 transducer elements 102 or 1 sub-array 110. It has been further discovered that the ability to shift the aperture 1202 through the transducer elements 102 while keeping the same relative position with the sub-arrays 110 allows the same linear delay slopes 502 of FIG. 5 to be used with four successive image lines 404 on linear arrays and curved linear arrays when the image lines 404 are all perpendicular to the transducer face, and eliminates small focus variability from image line 404 to image line 404 which can cause image artifacts.

Thus, it has been discovered that the sub-array receiver beamformer furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the sub-array receiver beamformer has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. An ultrasound receiver method comprising:
   generating analog signals with transducer elements arranged in a sub-array, the analog signals based on a return signal detected by the transducer elements during a receive interval;
   delaying the analog signals within analog delay lines and with individual delays unique to each of the transducer elements and calculated based on a linear delay slope;
   converting the analog signals to a digital signal;
   delaying the digital signal with a digital delay based on one portion of the linear delay slope; and
   updating the linear delay slope during the receive interval to adjust for multiple points within an image line.

2. The method of claim 1 wherein updating the linear delay slope includes updating the linear delay slope by monotonically incrementing or monotonically decrementing through a predefined set of linear delay slopes.

3. The method of claim 1 wherein delaying the analog signals includes looking up the individual delays for the analog signals of each of the transducer elements in a look up table using profile bits.

4. The method of claim 1 wherein delaying the analog signals includes pointing to a delay profile control register with a line number corresponding to the image line, the delay profile control register corresponding to the sub-array and the image line.

5. The method of claim 1 wherein delaying the analog signals includes delaying the analog signals for the transducer elements on outer portions of the sub-array with a bow correction based on a focal point being so close to the sub-array that the application of the individual delays based on the linear delay slope results in an error greater than a minimum focus resolution of a sub-array receiver beamformer, a digital beamformer, or a combination thereof.

6. An ultrasound receiver method comprising:
   generating analog signals with transducer elements arranged in a sub-array and the sub-array arranged in an aperture, the analog signals based on a return signal detected by the transducer elements during a receive interval;
   delaying the analog signals within analog delay lines and with individual delays unique to each of the transducer elements and calculated based on a linear delay slope;
   converting the analog signals to a digital signal;
   delaying the digital signal with a digital delay calculated based on a pivot point of the linear delay slope between center transducer elements;
   updating the linear delay slope during the receive interval to adjust for multiple points within an image line, the linear delay slope updated based on a delay profile control register containing depth bits corresponding to the multiple points; and
   stepping the aperture to a first adjacent transducer element before a second successive image line with a sub-array aperture shift multiplexer.

7. The method of claim 6 further comprising:
   stepping the aperture to a second adjacent transducer element before a third successive image line with the sub-array aperture shift multiplexer;
   stepping the aperture to a third adjacent transducer element before a fourth successive image line with the sub-array aperture shift multiplexer; and
   stepping the aperture to an adjacent sub-array and a fourth adjacent transducer element before a fifth successive image line with the sub-array aperture shift multiplexer.

8. The method of claim 6 wherein stepping the aperture with the sub-array aperture shift multiplexer includes stepping the aperture with a 4:1 multiplexer.

9. The method of claim 6 wherein stepping the aperture with the sub-array aperture shift multiplexer includes stepping the aperture with the sub-array aperture shift multiplexer having groups of switches all having identical switch states.

10. The method of claim 6 wherein stepping the aperture with the sub-array aperture shift multiplexer includes stepping the aperture with the sub-array aperture shift multiplexer controlled by two shift bits.

11. An ultrasound receiver system comprising:
   transducer elements arranged in a sub-array for generating analog signals based on a return signal detected by the transducer elements during a receive interval;
   analog delay lines including individual delays unique to each of the transducer elements and calculated based on a linear delay slope for delaying the analog signals;

an analog to digital converter for converting the analog signals to a digital signal;

a digital beamformer with a digital delay based on one portion of the linear delay slope for delaying the digital signal; and a profile control register containing depth bits corresponding to multiple points for updating the linear delay slope during the receive interval to adjust for the multiple points within an image line.

12. The system of claim 11 wherein the profile control register is a monotonic register configured to update the linear delay slope by monotonically incrementing or monotonically decrementing through a predefined set of linear delay slopes.

13. The system of claim 11 further comprising:

a look up table including a linear delay slope profile; and wherein the profile control register further contains profile bits corresponding to the linear delay slope profile of the look up table.

14. The system of claim 11 further comprising an address generator for pointing to a delay profile control register with a line number corresponding to the image line, the delay profile control register corresponding to the sub-array and the image line.

15. The system of claim 11 wherein the analog delay lines include a bow correction for the transducer elements on outer portions of the sub-array based on a focal point being so close to the sub-array that the application of the individual delays based on the linear delay slope results in an error greater than a minimum focus resolution of a sub-array receiver beamformer, a digital beamformer, or a combination thereof.

16. The system of claim 11 wherein:

the sub-array is arranged in an aperture;

the digital beamformer includes the digital delay based on a pivot point of the linear delay slope between center transducer elements; and further comprising a sub-array aperture shift multiplexer for stepping the aperture to a first adjacent transducer element before a second successive image line.

17. The system of claim 16 wherein the sub-array aperture shift multiplexer includes switches configured to:

step the aperture to a second adjacent transducer element before a third successive image line;

step the aperture to a third adjacent transducer element before a fourth successive image line; and step the aperture to an adjacent sub-array and a fourth adjacent transducer element before a fifth successive image line.

18. The system of claim 16 wherein the sub-array aperture shift multiplexer is a 4:1 multiplexer configured to step the aperture.

19. The system of claim 16 wherein the sub-array aperture shift multiplexer includes groups of switches all having identical switch states.

20. The system of claim 16 further comprising two shift bits for controlling the sub-array aperture shift multiplexer.

* * * * *